United States Patent
Kaser et al.

(10) Patent No.: US 10,083,110 B2
(45) Date of Patent: Sep. 25, 2018

(54) SYSTEMS AND METHODS FOR SOFTWARE TESTING AND TEST MANAGEMENT

(71) Applicant: American Express Travel Related Services Company, Inc., New York, NY (US)

(72) Inventors: Ravi Kaser, Scottsdale, AZ (US); John Bruno, Scottsdale, AZ (US); Dale Timberlake, Glendale, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 219 days.

(21) Appl. No.: 15/238,034

(22) Filed: Aug. 16, 2016

(65) Prior Publication Data

US 2018/0052764 A1    Feb. 22, 2018

(51) Int. Cl.
*G06F 11/00*    (2006.01)
*G06F 11/36*    (2006.01)

(52) U.S. Cl.
CPC ...... *G06F 11/3684* (2013.01); *G06F 11/3688* (2013.01); *G06F 11/3692* (2013.01)

(58) Field of Classification Search
CPC ............. G06F 11/3684; G06F 11/3688; G06F 11/3692
See application file for complete search history.

(56) References Cited

U.S. PATENT DOCUMENTS

| | | | |
|---|---|---|---|
| 2005/0166094 A1* | 7/2005 | Blackwell | G06F 11/3664 714/38.14 |
| 2009/0265681 A1* | 10/2009 | Beto | G06F 11/3672 717/100 |
| 2012/0030651 A1* | 2/2012 | Kemmler | G06F 11/3688 717/124 |
| 2012/0042302 A1* | 2/2012 | Sikandar | G06F 11/3688 717/125 |
| 2012/0185832 A1* | 7/2012 | Rossi | G06F 11/3688 717/131 |
| 2013/0152047 A1* | 6/2013 | Moorthi | G06F 11/368 717/124 |
| 2015/0261657 A1* | 9/2015 | Kommineni | G06F 11/3676 714/38.1 |
| 2016/0019135 A1* | 1/2016 | Gotlieb | G06F 11/3684 717/124 |
| 2017/0364435 A1* | 12/2017 | Adinarayan | G06F 11/3672 |
| 2018/0121318 A1* | 5/2018 | Ekambaram | G06F 11/3692 |

* cited by examiner

*Primary Examiner* — Marc Duncan
(74) *Attorney, Agent, or Firm* — Snell & Wilmer L.L.P.

(57) ABSTRACT

A software testing system may identify various test suites that include test conditions, test data, test environments, and/or a user access controls. The test suites may be used to generate a test bed map including dependencies of the various test suites. The system may assign test parameters to the various test suites including threshold values, severity values, and/or frequency values. The system may also generate a superscript based on the test bed map with the superscript configured to execute a first test suite before a second test suite in response to the dependency of the second test suite on the first test suite. The superscript may also include a reference to the test conditions, the test data, the test environments, and/or the user access controls. The system may monitor execution of the superscript to detect events that signals errors and/or parameter changes.

20 Claims, 6 Drawing Sheets

SYSTEMS AND METHODS FOR SOFTWARE TESTING AND TEST MANAGEMENT

FIELD

This disclosure relates to systems and methods for testing software and managing software tests.

BACKGROUND

Software testing is the process of verifying and validating that a computer-based system works as expected and meets user needs. One of the biggest challenges a test team faces in testing a complex system is interdependencies. Systems often rely on other systems and subsystems, thereby making testing and debugging more difficult. One system may throw errors that would typically indicate the system itself is not functioning as intended. However, the error may also arise from a faulty system on which the tested system depends. Additionally, there are often multiple teams building interdependent parts of the more complex end-to-end system. Simply testing the multiple independent parts, without recognizing dependencies, may not sufficiently test the end-to-end system.

Managing the entire testing process and testing related activities of these complex interdependent systems often proves critical to the success of the entire system. At the same time, efficiency in testing also has the desirable side effects of short testing times and smaller testing budgets. Much engineering time and computing resources go into generating testing tools. Thus, testing teams face the challenge of trying to leverage existing automation testing from subsystems during end-to-end testing of the entire system.

SUMMARY

A system, method, and computer readable medium (collectively, the "system") is disclosed for maintaining and executing regression test suites by generating a test bed map and a superscript. The system may identify various test suites that include test conditions, test data, test environments, and/or a user access controls. The test suites may be used to generate a test bed map including dependencies of the various test suites. The system may assign test parameters to the various test suites including threshold values, severity values, and/or frequency values. The system may also generate a superscript based on the test bed map with the superscript configured to execute a first test suite before a second test suite, in response to the dependency of the second test suite on the first test suite. The superscript may also include a reference to the test conditions, the test data, the test environments, and/or the user access controls. The system may monitor execution of the superscript to detect events that signals errors and/or parameter changes.

In various embodiments, the system may calculate an optimum execution path from the test bed map based on the severity values, the threshold values, and/or the frequency values. The optimum execution path may be reevaluated in response to detecting the event in response to a determination that the reset of the threshold value increased the threshold value, for example. The system may report execution errors using email messages, SMS messages, and/or a dashboard interface. Execution of the superscript may stop in response to detecting a flag on a feedback loop. The system may also read and/or write a historic data store containing data from previous test executions to determine the optimum execution path.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of various embodiments herein refers to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

The systems of the present disclosure may integrate preexisting test suites into a single testing environment. The systems may resolve testing interdependencies between multiple subsystems and provide a platform to orchestrate execution of preexisting test suites. The systems may build a test bed on the fly using a drag-and-drop user interface. Test suites may be arranged based on dependencies and fault tolerances to generate the test bed. The test bed may be used to create a single testing script configured to run the preexisting test suites in a predetermined order based on dependencies and fault tolerances. A single testing script as described above may also be referred to as a superscript. The superscript runs on a computer-based testing system to generate end-to-end test results for the tested system and subsystems.

As used herein, "single" may also include consolidating, less than a normal amount or a reduction (e.g., down to 2-4). As such, the systems may integrate preexisting test suites into a smaller or larger testing environment or into 2, 3 or 4 testing environments. The test bed may be used to create a smaller or larger testing script, or 2, 3 or 4 testing scripts.

Figure 1:
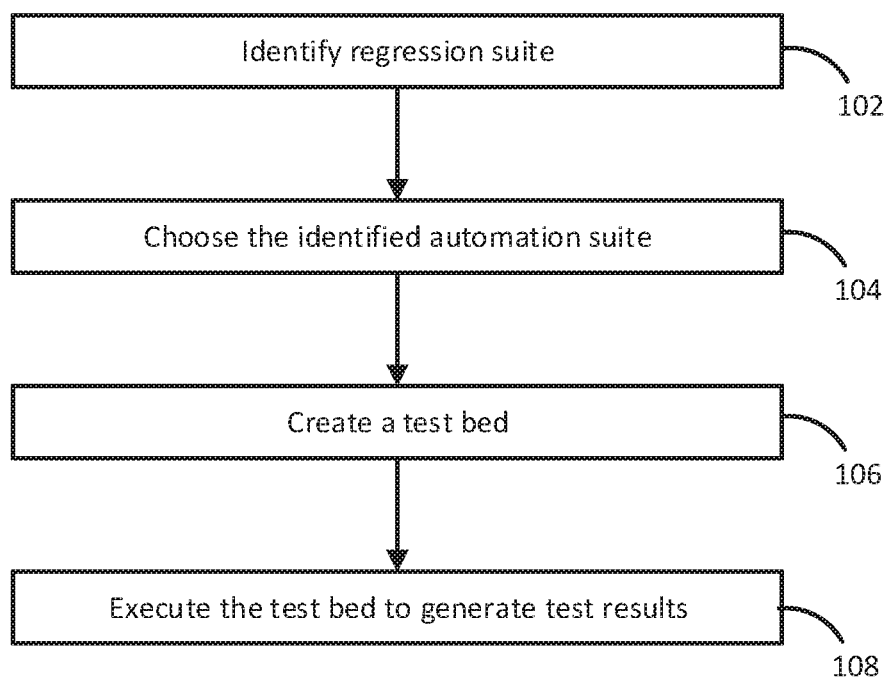
FIG. 1 illustrates an exemplary process for identifying and running multiple test suites having interdependencies, in accordance with various embodiments.

Referring to FIG. 1, an exemplary process 100 for generating and executing a superscript is shown, in accordance with various embodiments. A user may identify a regression test suite (Block 102). Identifying the regression test suite may include storing information from the test suite including test conditions, test data, test environment, test user, and/or test tool details. Test conditions may include identifying and/or defining a subset of testing processes with which the suite may be executed independently. For example, test conditions may include login, logout, procedure calls, http requests, and/or the like. Test data may include identified and/or defined test data for use with a test suite and how it is input into the system. Test environment may include identifying and/or defining the test environment that the test conditions run in. The test user may include identifying and/or defining the test user access used to perform the test. The testing tool details may include details of the automation tool used to build the automated suite.

In various embodiments, a user may choose the identified automation suite (Block 104). Choosing the identified test suite may include selecting a test suite via a drag-and-drop user interface. A user may drag and drop the test suites and test suite relationships into a test bed selection. The user may also drag and drop identified result conditions between the automated test suites (e.g., retry twice, then skip). The user may also drag and drop the next step for completion (e.g., in response to test suite failure, retry and then skip). The chosen test suites may be used to create a test bed (Block 106), as described above. The system may generate an orchestration file, which may be a flat file (e.g., an XML, JSON, http, or other type of tile). The orchestration file may contain information about the regression suites involved in Superscript and test execution details (error handling, recovery scenarios, and node skip mechanism).

The system may execute the test bed to generate test results (Block 108). Executing the test bed may include reading the orchestration file. The orchestration file instructs a superscript controller on the test setup for executing selected test suites. The orchestration file also contains interdependency details between test suites, as well as the error handling protocols for uninterrupted execution. Execution may also include scheduling the orchestration file. The controller may schedule the test suite execution based on the test suite interdependencies. The scheduler may also set/reset execution flags based on error handling. Executing the orchestration file may also include initiating the test suite and/or monitoring its execution. A feedback loop may provide continuous status updates to the controller. Execution of the test suites may run in the background in standby mode. The controller may trigger alerts to start/stop execution of automation suites. Test reports that are output by the system may be customized per system requirements.

Figure 2:
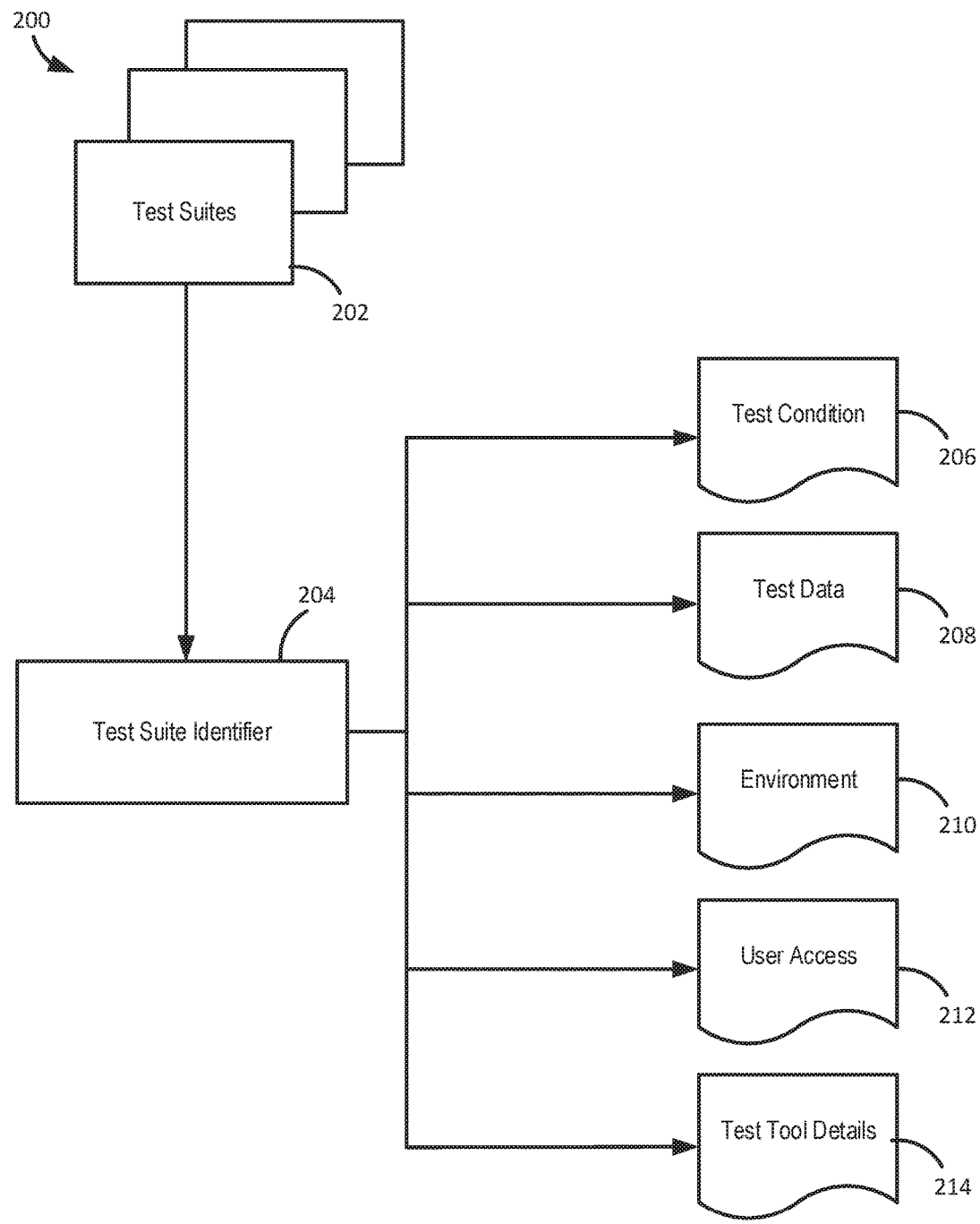
FIG. 2 illustrates an exemplary test system interface for identifying testing systems with interdependencies using existing test suites, in accordance with various embodiments.

Referring now to FIG. 2, an exemplary process 200 for identifying test suites is shown, according to various embodiments. Test suites 202 may be stored in a repository, database, or otherwise made available to test suite identifier 204. Test suite identifier 204 takes test suites 202 as input. Test suites 202 are transformed by test suite identifier 204 to identify test conditions 206, test data 208, test environment 210, user access 212, and/or test tool details 214. The identified test conditions, test data, test environments, user access data, and/or test tool details generated by the of test suites identifier 204 may be associated with test suites 202 and made available in a human readable format for later use in an execution orchestration file in, for example, XML, JSON, excel, CSV, and/or other suitable file types.

Figure 3:
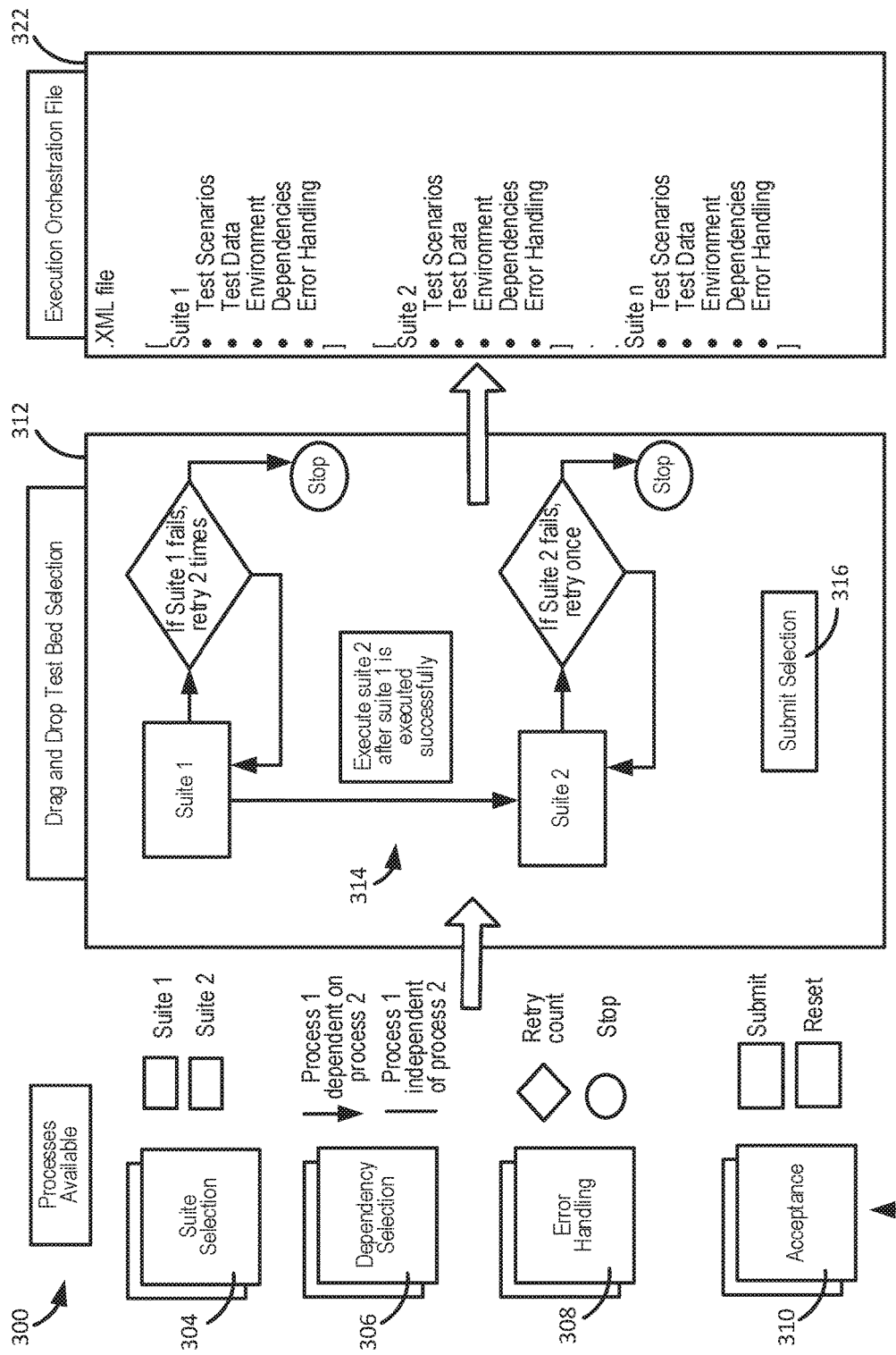
FIG. 3 illustrates an exemplary interface for arranging test suites and dependencies for execution, in accordance with various embodiments.

With reference to FIG. 3, superscript generation interface 300 is shown, in accordance with various embodiments. Superscript generation interface 300 may include drag-and-drop elements 302 to facilitate suite selection 304, dependency selection 306, error handling 308, and/or acceptance 310. Drag-and-drop elements 302 including identified test suites 202 may be dragged into a test bed map 314 using test-bed-selection interface 312. For example, suite 1 and suite 2 may each be placed in test bed map 314. Although a drag-and-drop interface is illustrated, other interfaces may enable users to identify test suites 202 and dependencies.

In various embodiments, dependencies may be identified using dependency selection 306. For example, an arrow may be placed in test bed map 314 and connected between two processes to indicate process 1 is dependent on process 2 or process 2 is dependent on process 1. The phrase "dependent on" as used with reference to process 1 being dependent on process 2 may mean that process 1 relies on successful execution of process 2 and should execute after satisfactory execution of process 2. A non-arrowed line may be placed in test bed map 314 and connected between two processes to indicate process 1 is independent of process 2. The term independent, as used with reference to test bed map 314, means that process I does not rely on successful execution of process 2 and may execute concurrently with or in any order relative to process 2.

In various embodiments, error handling 308 may be used to enter error handling procedures. Error handling 308 may include retry counts and/or hard stops on execution. Retry counts may enable a test suite to be re-executed after failed executions. For example, in FIG. 3 suite 2 is configured to re-execute one time after a failed execution. The superscript shown in FIG. 3 is also configured to stop execution after a second failed execution of suite 2 by placing a stop button on test bed map 314. Execution of the presently executing test suite as well as each dependent test suite may stop in response to reaching a stop point in test bed map 314. Independent test suites may continue execution despite reaching a stop point on the presently executing test suite. Acceptance may be used to submit the test bed map 314 to generate a superscript or reset test bed map 314. In response to submitting test bed map 314, execution orchestration file 322 may be generated. Execution orchestration file 322 may include test scenarios, test data, environment, dependencies, error handling, and other details as included in test suites 202 and test bed map 314.

Figure 4:
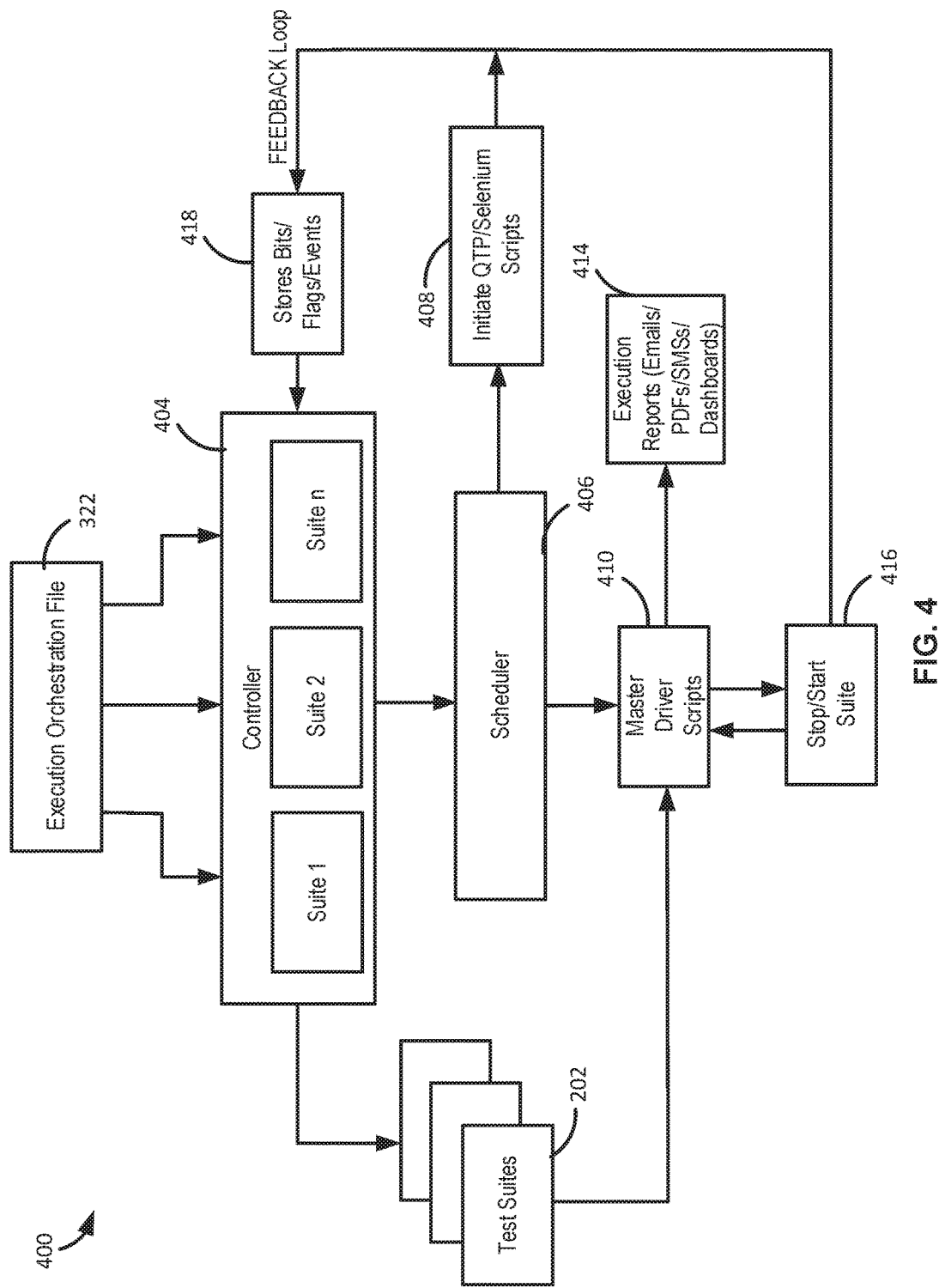
FIG. 4 illustrates an exemplary system for executing test suites having interdependencies, in accordance with various embodiments.

Referring now to FIG. 4, an exemplary test engine 400 is shown, in accordance with various embodiments. Execution orchestration file 322 may be input into test engine 400 to facilitate execution of test bed map 314 (of FIG. 3). In that regard, controller 404 may parse an input file including test scenarios, test data, environment, dependencies, error handling, and other execution details. Controller 404 may interpret execution orchestration file 322 to determine which test suites 202 to execute, in which order, how to handle errors, how to output results, and otherwise how to oversee execution of the superscript. Controller 404 may communicate with scheduler 406 to schedule execution of the test suites 202 in order of dependencies. Scheduler 406 may also initiate scripts 408 including quicktest professional (QTP), Selenium, visual basic, or other test scripting tools used in test suites 202.

In various embodiments, the master driver scripts 410 may be in communication with scheduler 406 to report results and errors by outputting execution reports 414. Execution reports 414 may include logs, emails, PDF files, SMS messaging, graphical dashboards, or other suitable output formats. Execution reports 414 may include details on failures including which suite, which routine, which test data, etc., resulted in an error or failure. Execution reports may also include logs and output for successful executions including timestamps and execution durations for successful tests using various test suites, test data, test routines, etc.

In various embodiments, the Controller 404 may instruct scheduler 406 to stop and start suites 416 based on feedback received from the test suite execution 408. Controller 404 may receive data on the feedback loop for use in controlling and/or scheduling the execution of the test suites 202. The test engine 400 may rely on multiple routines and subroutines to select the execution order of test suites 202, schedule execution, and report results.

Figure 5:
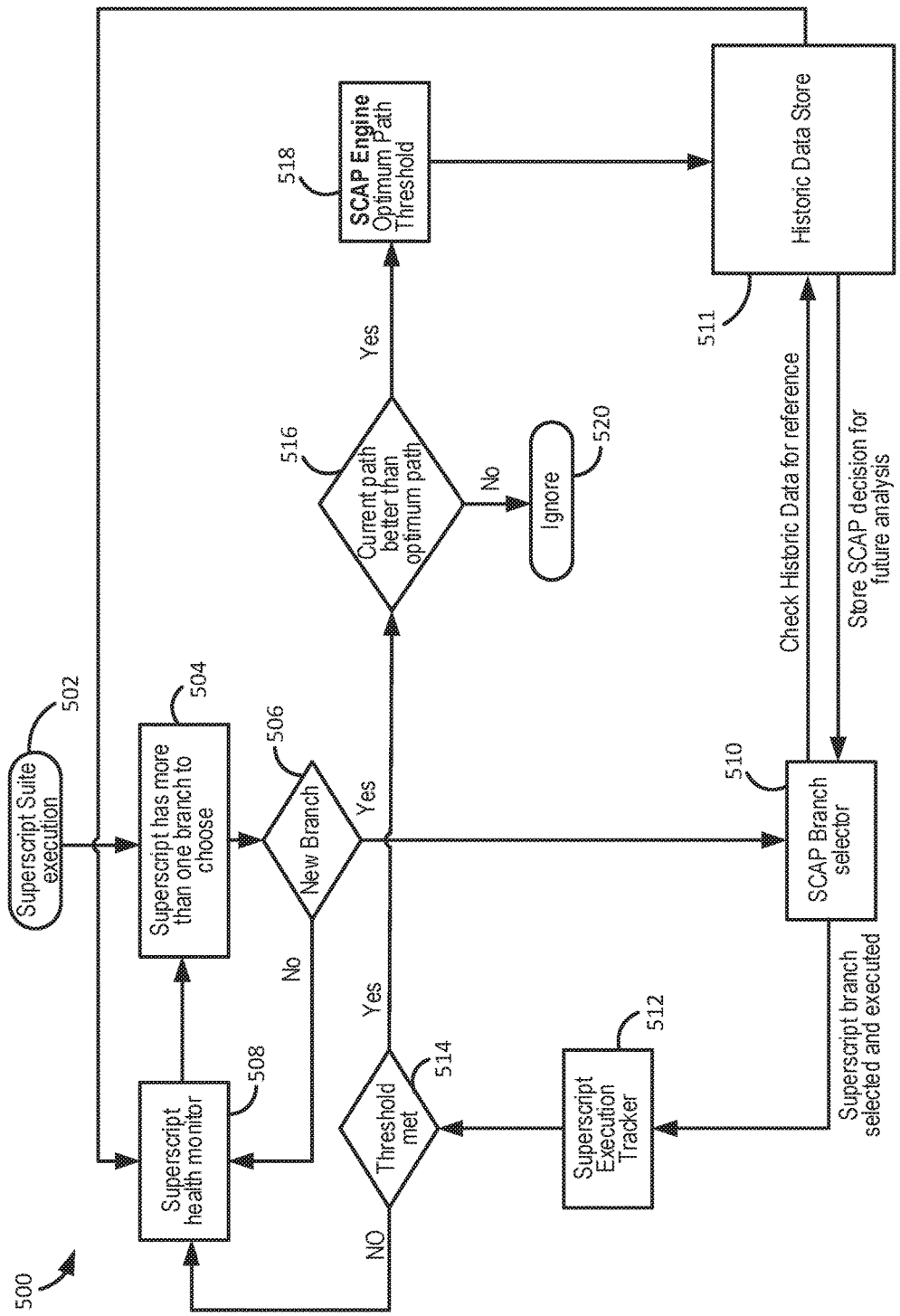
FIG. 5 illustrates an exemplary process for executing test suites having interdependencies, in accordance with various embodiments.

Referring now to FIG. 5, the superscript core algorithm process 500 (SCAP) is shown for controlling branch execution, in accordance with various embodiments. SC AP 500 is a central process of test engine 400 that hosts multiple subroutines and algorithms. SCAP 500 powers test engine 400 and makes test engine 400 sustaining, self-evolving, and self-learning. Test engine 400 may run with little or no human intervention in various embodiments. SCAP 500 uses configurable parameters to make test engine 400 available with near 100% uptime and make decisions in the case of an "event." SCAP 500 for controlling branch execution may begin with superscript suite execution (Block 502).

SCAP 500 may have more than one branch available for execution (Block 504). SCAP 500 may determine whether to execute a new branch (Block 506). In response to executing a new branch, SCAP 500 may use the SCAP branch selector (Block 510) to select and execute a superscript branch. Superscript execution tracker may track execution and record execution results and/or errors (Block 512). SCAP 500 may determine if the threshold is met for successful branch execution (Block 514). A threshold value may be a minimum percentage applied to a suite branch to determine whether branch execution is successful.

In response to the threshold not being met, SCAP 500 may run the superscript health monitor in the background to detect errors and intervention requests (Block 508). In response to detecting a success rate below the threshold value, the SCAP 600 may ignore the previous decision and look for a new decision based on the algorithm. SCAP 600 may also capture the new decision in a historic data store 511 and tracks its "success rate" for future analysis. Thus, the SCAP 600 may learn from each past decision to make better future decisions. SCAP 500 may also return to the state in which SCAP 500 has more than one available branch to choose (Block 504).

In response to the threshold being met in Block 514, SCAP 500 may determine whether the current path is better than the previous optimum path (Block 516). SCAP 500 may determine execution paths that would successfully execute the tests as placed in test bed map 314. Different execution paths may include varying execution order, execution frequency, and/or error handling characteristics for the various test suites in test bed map 314. SCAP 500 may have an ultimate goal executing the maximum number of critical branches with maximum success rate. In that regard, SCAP 500 may tend to push the success rate of critical branches to the highest possible level. To attain maximum or near maximum success rates for a given value of threshold, SCAP 500 may explore all the possible permutations and combinations of different branches of a superscript. SCAP 500 may record its success rates until it finds the best route. The best route may he the route that results in the maximum success rate or optimum path. Again, as the threshold changes, the SCAP 500 takes this as an event. SCAP 500 may recalculate the optimum path in response to an event.

In response to the current path not being better than the optimum path, SCAP 500 may ignore the current path (Block 520). In response to the current path being better than the optimum path, SCAP 500 may call the SCAP engine with the optimum path threshold. SCAP 500 may determine the optimum path based in part on historic data store 511. The SCAP 500 may generally map the execution of a superscript on test engine 400.

Figure 6:
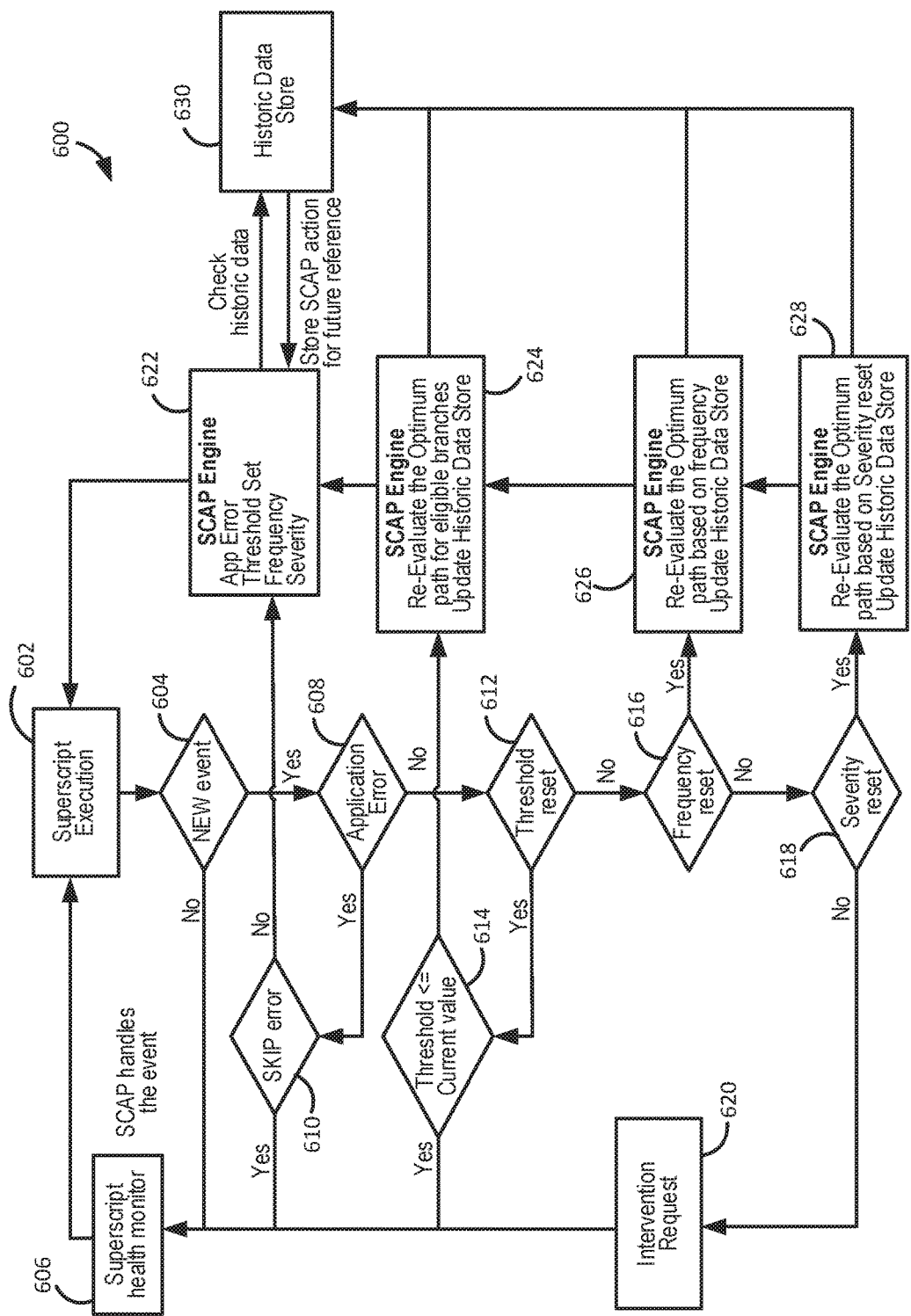
FIG. 6 illustrates an exemplary process for error handling and executing test suites having interdependencies, in accordance with various embodiments.

Referring now to FIG. 6, an exemplary SCAP 600 algorithm of test engine 400 for handling events during execution is shown, in accordance with various embodiments. The term "event" may describe a condition or a trigger that causes the superscript equilibrium to shift. An equilibrium shift may include, for example, a process failure in the superscript execution, a user request to run high severity regression suites only, a user request to trigger superscript every 4 hours instead of every 24 hours by default, or a user request to change the lower/upper optimum "threshold" values. The minimum threshold value may be referenced in calculating an optimum suite path.

In response to an event, the SCAP 600 may use the hosted algorithms to decide on the next steps of superscript execution in real-time. SCAP 600 may utilize multiple configurable parameters to determine the optimum path. SCAP 600 may be invoked in response to superscript execution (Block 602). SCAP 600 may detect an event and determine whether the event is new (Block 604). In response to the event being a previously detected and handled event, SCAP 600 may run the superscript health monitor in the background to detect further errors and events (Block 606). In response to the event being new, SCAP 600 may determine whether the event is an application error (Block 608).

In response to the test engine 400 encountering an application execution or system error, and based on the error severity, SCAP 600 may decide to skip, retry or ignore the application error (Block 610). Based on the error parameter, the SCAP 600 may decide on the next step. In that regard, SCAP 600 may decide whether to skip and move on to the next branch. SCAP 600 may also stop the branch and choose the next branch for execution. SCAP 600 may execute superscript health monitor in the background in response to successfully skipping, ignoring, or otherwise handling the error (Block 606).

In response to an application error in test suite 202 that is not suitable for skipping or ignoring, the SCAP 600 may set new equilibrium for the optimum path. The optimum path may be set by invoking the SCAP engine to consider parameters such as application errors, threshold value, frequency, and severity for a branch or suite (Block 622). The SCAP engine may refer to the historic data store 630 to check whether an event occurred previously, what decision SCAP 600 made in response to the event, and the "success rate" in responding to the event. Historic data store 630 may be stored in a database indexed by event type and/or an event code, for example. Actions and path decisions made by SCAP engine may be stored in historic data store 630 for future reference.

SCAP 600 may be configured for threshold-based error handling. In response to the new event not being an application error (in Block 608) SCAP 600 may determine whether a threshold value was reset or altered (Block 612). Threshold values may be configurable by users or external systems. A threshold value may be a desired success rate for a given branch to be considered for optimum path. The threshold value may be a percentage representing the critical suite passage rate for the given branch. If the passage percentage value is greater than the threshold value, the data may be considered for optimum path analysis. If the passage percentage value is less than or equal to the threshold value, it may be ignored. A change in a threshold value may cause the change in optimum path evaluation.

In response to a threshold change or reset (in Block 612), SCAP 600 may determine whether the new threshold value is greater than the current threshold value (Block 614). If the new threshold value is greater than the current threshold value (reflecting a reduced tolerance for faults), SCAP 600 may invoke the SCAP engine to re-evaluate the optimum path based on the threshold value (Block 628). If the new threshold value is less than the current threshold value (i.e., reflecting an increased fault tolerance), then the optimized path may not be re-evaluated. In response to an increased fault tolerance, SCAP 600 may run superscript health monitor in the background to detect further events and errors (Block 606). The SCAP engine may update historic data store to include the re-evaluated optimum path and threshold parameter resulting in the re-evaluated optimum path (Block 628).

SCAP 600 may also be configured for frequency based error handling. In response to the threshold value not being altered, SCAP 600 may determine whether an execution frequency has been reset or altered (Block 616). That is, a user may set multiple suites to he executed on different frequencies. For example, supported frequencies may include: on request (0), daily once (1), every 12 hours (2), every hour (3), or any other desirable execution frequency. In response to a frequency change or reset (in Block 616), SCAP 600 may invoke the SCAP engine to re-evaluate the optimum path based on the new frequency value (Block 626). Historic data store may be updated to include the re-evaluated optimum path and frequency parameter resulting in the re-evaluated optimum path (Block 628).

SCAP 600 may be configured for error handling based on severity of test suite 202. In response to the frequency not being reset, SCAP 600 may determine whether a severity has been reset (Block 618). That is, a user may set the superscript to execute the various suites with a failure severity tolerance in mind. Different severity levels may be set by a user or by default. For example, exemplary severity levels might include: Severity 1—Must Pass for with 100% success rate (all test must pass for optimum path); Severity 2—Should pass for 75% success rate (75% must pass for optimum path); and Severity 3—Could pass for 50% success rate (50% must pass for optimum path). In response to a severity change or reset (in Block 618), SCAP 600 may invoke the SCAP engine to re-evaluate the optimum path based on the severity score (Block 628). Historic data store may be updated to include the re-evaluated optimum path and severity parameter resulting in the re-evaluated optimum path (Block 628).

SCAP 600 may also be configured to support human intervention in error handling. In response to severity not being reset, SCAP 600 may detect an intervention request or opportunity for a user or external system (Block 620). In an event when none of the defined parameters in SCAP 600 were able to handle the superscript execution (e.g., new events, application errors, thresholds, and frequencies), a trigger may be generated to request the user input additional parameters or make a decision. The SCAP engine may be configured to cascade re-evaluations of the optimum path based on events and parameters. In that regard, any time the SCAP engine is invoked to reevaluate, it may consider application error, threshold, frequency, severity, and/or other parameters as described in blocks 622, 624, 626, and/or 628.

By updating the optimized path history and parameters, SCAP 600 may learn and improve execution characteristics over time. SCAP 600 may also tend to increase the likelihood of successful execution to maximum confidence levels. As developers write new test cases and test suites to test system changes, the new tests may be integrated into test engine 400 by adding the test suites to test bed map 314. The superscript may grow and change over time as the library of test suites 202 grows. Test bed map 314 also grows and evolves over time as mapped test suites and corresponding dependencies change with new development. Developers may add their newly written tests to test bed map 314 and to facilitate testing at every level of a system having a diverse set of platforms, from end to end, by executing a single superscript.

In various embodiments, the system and method may include alerting a subscriber when their computer is offline. The system may include generating customized information and alerting a remote subscriber that the information can be accessed from their computer. The alerts are generated by filtering received information, building information alerts and formatting the alerts into data blocks based upon subscriber preference information. The data blocks are transmitted to the subscriber's wireless device which, when connected to the computer, causes the computer to auto-launch an application to display the information alert and provide access to more detailed information about the information alert. More particularly, the method may comprise providing a viewer application to a subscriber for installation on the remote subscriber computer; receiving information at a transmission server sent from a data source over the Internet, the transmission server comprising a microprocessor and a memory that stores the remote subscriber's preferences for information format, destination address, specified information, and transmission schedule, wherein the microprocessor filters the received information by comparing the received information to the specified information; generates an information alert from the filtered information that contains a name, a price and a universal resource locator (URL), which specifies the location of the data source; formats the information alert into data blocks according to said information format; and transmits the formatted information alert over a wireless communication channel to a wireless device associated with a subscriber based upon the destination address and transmission schedule, wherein the alert activates the application to cause the information alert to display on the remote subscriber computer and to enable connection via the URL to the data source over the Internet when the wireless device is locally connected to the remote subscriber computer and the remote subscriber computer comes online.

In various embodiments, the system and method may include a graphical user interface for dynamically relocating/rescaling obscured textual information of an underlying window to become automatically viewable to the user. By permitting textual information to be dynamically relocated based on an overlap condition, the computer's ability to display information is improved, More particularly, the method for dynamically relocating textual information within an underlying window displayed in a graphical user interface may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., email) to prevent a computer from being compromised, for example by being infected with a computer virus. The system may scan electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new tile, which forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

In various embodiments, the system may also address the problem of retaining control over customers during affiliate purchase transactions, using a system for co-marketing the "look and feel" of the host web page with the product-related content information of the advertising merchant's web page. The system can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link is not transported from the host web page to the merchant's web page, but instead is re-directed to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the customer as associated with the host web page. The server transmits and presents this composite web page to the customer so that she effectively remains on the host web page to purchase the item without being redirected to the third party merchant affiliate. Because such composite pages are visually perceived by the customer as associated with the host web page, they give the customer the impression that she is viewing pages served by the host. Further, the customer is able to purchase the item without being re-directed to the third party merchant affiliate, thereby allowing the host to retain control over the customer. This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Terms and phrases similar to "associate" and/or "associating" may include tagging, flagging, correlating, using a look-up table or any other method or system for indicating or creating a. relationship between elements, such as, for example, (i) a transaction account and (ii) an item (e.g., offer, reward, discount) and/or digital channel. Moreover, the associating may occur at any point, in response to any suitable action, event, or period. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a computing system including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general-purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross-over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to refer generally to media such as, for example, removable storage drives, hard disks, solid-state drives, CD media, or DVD media. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine to perform the functions described herein will be apparent to persons skilled in the relevant art(s).

In various embodiments, the systems described herein may include application servers (e.g. WEB SPHERE, WEB LOGIC, JBOSS). For example, superscript generation interface 300 may be developed as a web-based interface. In various embodiments, the server may include web servers (e.g. APACHE, IIS, GWS, SUN JAVA® SYSTEM WEB SERVER).

In that regard, the computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Furthermore, any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® APPLE®ts, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., Alex Nghiem, IT Web Services: A Roadmap for the Enterprise (2003), hereby incorporated by reference.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially available web-browser software package.

As those skilled in the art will appreciate, a web client includes an operating system (e.g., WINDOWS®/CE/Mobile, OS2, UNIX®, LINUX®, SOLARIS®, MacOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE®talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, Dilip Naik, Internet Standards and Protocols (1998); JAVA® 2 Complete, various authors, (Sybex 1999); Deborah Ray and Eric Ray, Mastering HTML 4.0 (1997); and Loshin, TCP/IP Clearly Explained (1997) and David Gourley and Brian Totty, HTTP, The Definitive Guide (2002), the contents of which are hereby incorporated by reference.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at hftp://csrc.nist.gov/publications/nistpubs/800-145/SP800-145.pdf (last visited June 2012), which is hereby incorporated by reference in its entirety.

Any databases discussed herein may include relational, hierarchical, graphical, or object-oriented structure and/or any other database configurations. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database-tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Practitioners will also appreciate that there are a number of methods for displaying data within a document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code in C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
    identifying, by a processor, a first test suite and a second test suite from a plurality of test suites, wherein the first test suite includes a test condition, test data, a test environment, and a user access control;
    creating, by the processor, a test bed map including the first test suite and the second test suite, wherein the test bed map indicates a dependency of the second test suite on the first test suite;
    assigning, by the processor, a threshold value, a severity, and a frequency to the first test suite;
    generating, by the processor, a superscript based on the test bed map, wherein the superscript is configured to execute the first test suite before the second test suite in response to the dependency, wherein the superscript refers to the test condition, the test data, the test environment, and the user access control; and
    monitoring, by the processor, an execution of the superscript to detect an event that signals at least one of an error, a reset of the threshold value, a reset of the frequency, or a reset of the severity.

2. The method of claim 1, further comprising calculating, by the processor, an optimum execution path from the test bed map based on at least one of the severity, the threshold value, or the frequency.

3. The method of claim 2, further comprising reevaluating, by the processor, the optimum execution path in response to detecting the event.

4. The method of claim 3, wherein the reevaluating, by the processor, the optimum execution path is in response to a determination that the reset of the threshold value increased the threshold value.

5. The method of claim 1, further comprising reporting, by the processor, an execution error using at least one of an email message, an SMS message, or a dashboard.

6. The method of claim 1, further comprising stopping, by the processor, the execution of the superscript in response to detecting a flag on a feedback loop signaling a fatal execution error.

7. The method of claim 1, further comprising reading, by the processor, a historic data store containing data from previous test executions to determine an optimum execution path.

8. A computer-based system, comprising:
    a processor; and
    a tangible, non-transitory memory configured to communicate with the processor, the tangible, non-transitory memory having instructions stored thereon that, in response to execution by the processor, cause the processor to perform operations comprising:
    identifying, by the processor, a first test suite and a second test suite from a plurality of test suites, wherein the first test suite includes a test condition, test data, a test environment, and a user access control;
    creating, by the processor, a test bed map including the first test suite and the second test suite, wherein the test bed map indicates a dependency of the second test suite on the first test suite;
    assigning, by the processor, a threshold value, a severity, and a frequency to the first test suite;
    generating, by the processor, a superscript based on the test bed map, wherein the superscript is configured to execute the first test suite before the second test suite in response to the dependency, wherein the superscript refers to the test condition, the test data, the test environment, and the user access control; and
    monitoring, by the processor, an execution of the superscript to detect an event that signals at least one of an error, a reset of the threshold value, a reset of the frequency, or a reset of the severity.

9. The computer-based system of claim 8, further comprising calculating, by the processor, an optimum execution path from the test bed map based on at least one of the severity, the threshold value, or the frequency.

10. The computer-based system of claim 9, further comprising reevaluating, by the processor, the optimum execution path in response to detecting the event.

11. The computer-based system of claim 10, wherein the reevaluating, by the processor, the optimum execution path is in response to a determination that the reset of the threshold value increased the threshold value.

12. The computer-based system of claim 8, further comprising reporting, by the processor, an execution error using at least one of an email message, an SMS message, or a dashboard.

13. The computer-based system of claim 8, further comprising stopping, by the processor, the execution of the superscript in response to detecting a flag on a feedback loop signaling a fatal execution error.

14. The computer-based system of claim 8, further comprising reading, by the processor, a historic data store containing data from previous test executions to determine an optimum execution path.

15. An article of manufacture including a non-transitory, tangible computer readable storage medium having instructions stored thereon that, in response to execution by a test engine, cause the test engine to perform operations comprising:
    identifying, by the test engine, a first test suite and a second test suite from a plurality of test suites, wherein the first test suite includes a test condition, test data, a test environment, and a user access control;
    creating, by the test engine, a test bed map including the first test suite and the second test suite, wherein the test bed map indicates a dependency of the second test suite on the first test suite;
    assigning, by the test engine, a threshold value, a severity, and a frequency to the first test suite;
    generating, by the test engine, a superscript based on the test bed map, wherein the superscript is configured to execute the first test suite before the second test suite in response to the dependency, wherein the superscript refers to the test condition, the test data, the test environment, and the user access control; and
    monitoring, by the test engine, an execution of the superscript to detect an event that signals at least one of an error, a reset of the threshold value, a reset of the frequency, or a reset of the severity.

16. The article of claim 15, wherein the operations further comprise calculating, by the test engine, an optimum execution path from the test bed map based on at least one of the severity, the threshold value, or the frequency.

17. The article of claim 16, wherein the operations further comprise reevaluating, by the test engine, the optimum execution path in response to detecting the event in response to a determination that the reset of the threshold value increased the threshold value.

18. The article of claim 15, wherein the operations further comprise reporting, by the test engine, an execution error using at least one of an email message, an SMS message, or a dashboard.

19. The article of claim 15, wherein the operations further comprise stopping, by the test engine, the execution of the superscript in response to detecting a flag on a feedback loop signaling a fatal execution error.

20. The article of claim 15, wherein the operations further comprise reading, by the test engine, a historic data store containing data from previous test executions to determine an optimum execution path.

* * * * *